United States Patent

[11] 3,595,396

| [72] | Inventors | Svatopluk Mackrle<br>No. 5 Pavlikova, Brno;<br>Vladimir Mackrle, No. 8 Na Micance,<br>Praha 6, both of, Czechoslovakia |
|---|---|---|
| [21] | Appl. No | 872,283 |
| [22] | Filed | Oct. 29, 1969 |
| [45] | Patented | July 27, 1971 |
| [32] | Priority | Nov. 8, 1968 |
| [33] | | Switzerland |
| [31] | | 16724/68 |

[54] ARRANGEMENT FOR WATER TREATMENT
9 Claims, 5 Drawing Figs.

[52] U.S. Cl................................................... 210/203,
210/208
[51] Int. Cl................................................... B01d 21/08
[50] Field of Search........................................... 210/208,
219, 203, 265

[56] References Cited
UNITED STATES PATENTS

| 2,264,139 | 11/1941 | Montgomery et al....... | 210/199 X |
| 2,427,886 | 9/1947 | Walker....................... | 210/208 X |

*Primary Examiner*—J. L. DeCesare
*Attorney*—Michael S. Striker

ABSTRACT: Arrangement for water treatment using for removal of impurities coagulation agents with subsequent separation of the thus created floccular suspension by means of a perfectly fluidized sludge blanket. The arrangement comprises a sludge blanket compartment, a sludge concentrator compartment and possibly also a homogenizer and filter compartment, most of which compartments arranged within cylindrical vessels placed horizontally, with the bottom part of the sludge blanket compartment determined by the mantles of at least two adjacent cylindrical vessels. The arrangement is particularly designed for larger size water treatment plants.

ARRANGEMENT FOR WATER TREATMENT

BACKGROUND OF THE INVENTION

This invention relates to an arrangement for water treatment where the impurities contained in the water are coagulated by chemical agents and the thus created floccular suspension is caused to concentrate in a perfectly fluidized sludge blanket which is drained by overflow. In similar cases usually a two step separation process is used; in the first step the bulk of the floc-suspension is removed by sludge blanket filtration and the rest of the suspension is removed in the second step by filtration by passage through a granular filter bed. A fully fluidized sludge blanket and a multilayer filtration bed of granular material are particularly effective as separation means in water treatment.

The effectiveness of the filtration and separation processes depends in addition to the design parameters of the separation equipment largely on the floc volume concentration and size distribution of the flocs formed in the agglomeration part of the arrangement.

Both volume concentration and size distribution of the floc-suspension may be varied over a wide range by changing the hydrodynamic conditions of agglomeration the mean velocity gradient and the time of homogenization, to which the chemically formed floc-suspension is exposed. Intensive homogenization can considerably increase the filterability of the floc-suspension. Effective homogenization for obtaining optimum filterability of the suspension in chemical water treatment requires a value of the Camp number up to 150.000. To provide a water treatment equipment with homogenizing having such a high Camp number requires a large homogenizer with sufficient detention time and relatively high energy input. Dimensions of the homogenizer and energy consumption depends largely on the shape of the homogenizer and on the shape of the rotor and stator applied for homogenizing.

Homogenizing of the floc-suspension is particularly effective when inorganic agglomeration agents are used in combination with polycoagulants. Effective and economic utilization of polycoagulants in water treatment necessitates usually an intensive homogenization of the floc-suspension created by inorganic agglomeration agents prior to the addition of polycoagulants to the treated water. Under proper homogenizing conditions and with proper addition of chemical reagents an increase of the filtration velocity of the filtration separation process in the perfectly fluidized sludge blanket up to 50 percent can be obtained.

The application of the described principles of homogenization of the floc-suspension in water treatment and incorporation of an effective homogenizer into compact water treatment reactors offers substantial difficulties raised mainly by the problem of a uniform distribution of the treated water with the homogenized floc-suspension in the sludge blanket compartment. Actually a satisfactory solution of a homogenizer with a high Camp number fullfilling optimum conditions for homogenizing, integrated into a compact water treatment reactor, with appropriate polycoagulant dosing, is known only for small units of a capacity of 1 to 5 liter per second.

Such a solution consists of a large vertical cylindrical homogenizer located centrally in a spherical water treatment reactor. The uniform distribution of the homogenized suspension with the treated water in the sludge blanket compartment is obtained by direct communication of the homogenizer with the sludge blanket compartment by means of a concentric slot located at the bottom of the homogenizer. Such a vertical, concentric shape of the homogenizer can be applied only for very small units, where the ratio of the height and diameter of the reactor, permits a satisfactory incorporation of the homogenizer in the reactor.

Besides the mentioned difficulties, integration of an effective homogenizer, into the large known systems of water treatment reactors bring about many other drawbacks. Due to large dimensions of different elements of the water treatment plants, usually in the shape of large concrete basins, the plants become expensive and require relatively long erection time.

It is an object of this invention to provide an arrangement for water treatment, which would be compact, require only a limited space and which would be flexible in operation.

It is another object of this invention to provide an arrangement, which could be for plants of different size combined from a number of standard units easy to manufacture and which would be adapted for outdoor service.

The arrangement according to this invention is combined from a number of vessels, most of which are cylindrically in shape and arranged horizontally and are mutually interconnected by channels, slots and overflows. A number of compartments is thus formed, each of which performing its special task.

DESCRIPTION OF PREFERRED EMBODIMENT

Figure 1:
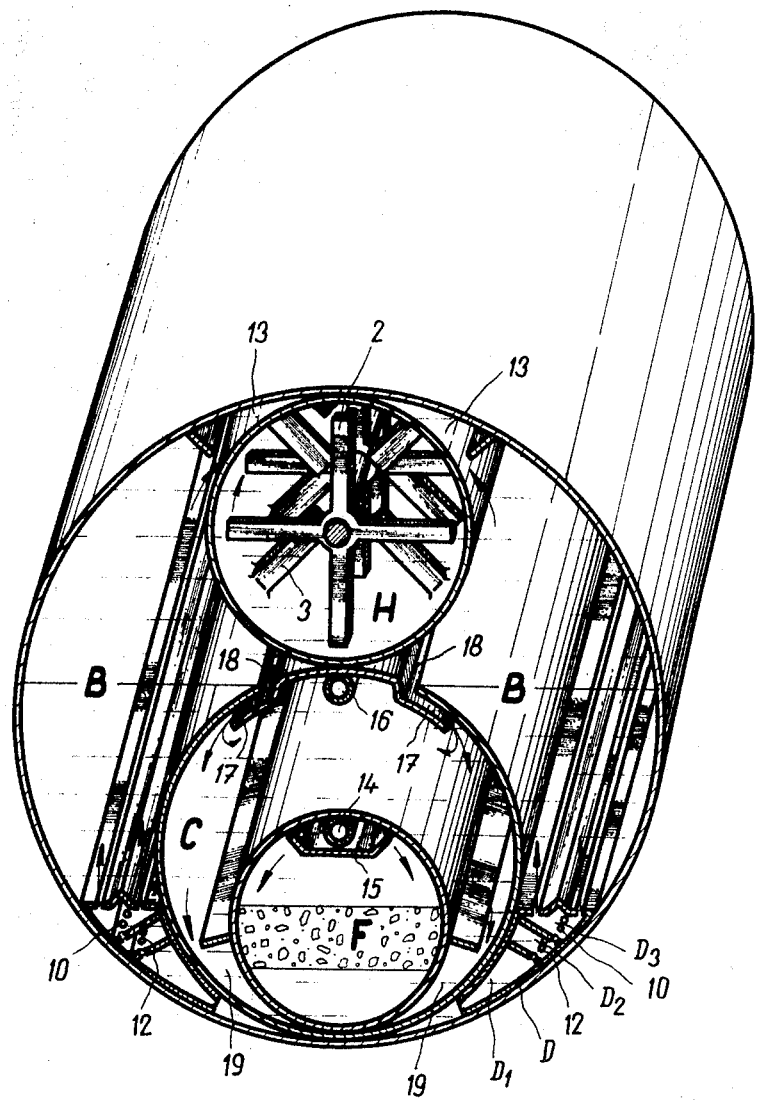
FIG. 1 of the drawings shows a schematic vertical cross section of one of possible embodiments of the object of this invention.
Figure 2:
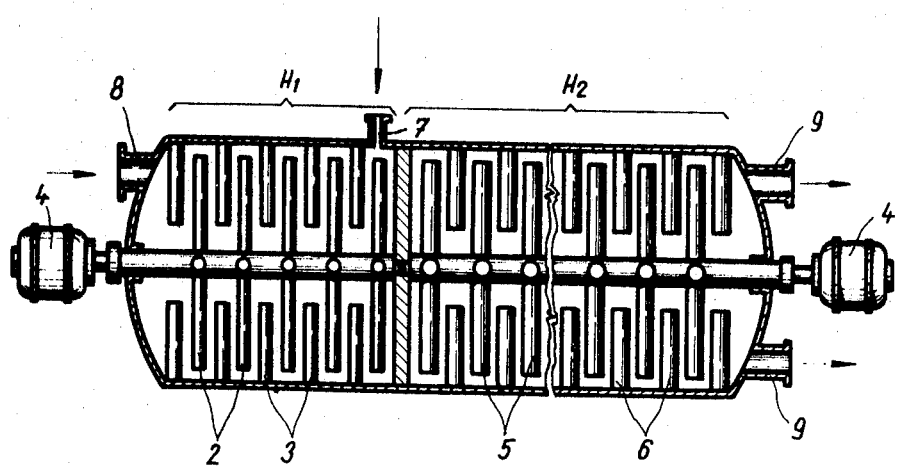
FIG. 2 is a longitudinal sectional view of a homogenizer.
Figure 3:
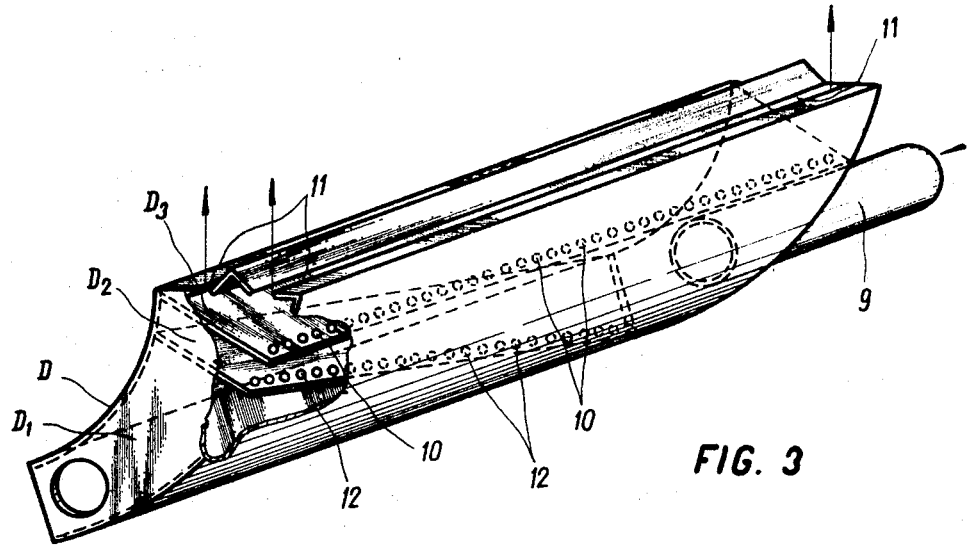
FIG. 3 is an axonometric view of a raw water distribution channel, by means of which the treated water is supplied to the sludge blanket compartment.

The water treatment reactor schematically shown on FIG. 1 with details on FIG. 2 and FIG. 3 is best suited for units of small and medium capacity in the range of 5 to 80 liters per second. The reactor consists of four cylindrical horizontal vessels; the external vessel 1, the homogenizer H, the sludge concentrator C, and the filter F. The homogenizer H is placed on the top of the sludge concentrator C, and both vessels are located inside the external vessel 1. The sludge blanket compartment B is determined by the wall of the outer vessel 1 and by the walls of the homogenizer H and sludge concentrator C. The homogenizer H consists of two section H1 and H2, each of them provided with different types of rotors and stators. The first section H1 of the homogenizer H is provided with a rotor 2 and a stator 3 both having homogenizing blades in the shape of profiled paddles, enabling an intensive homogenization in the section H1. The rotor 2 is driven by a motor 4. Section H1 is provided with a supply tube 8 and with a tube 7 for dosage of polycoagulants. The second section H2 is provided with a rotor 5 and a stator 6 both having perforated homogenizing blades. The rotor 5 is propelled by the motor 4. The end of the section H2 is connected by tubes 9 with the distribution channel D, which is located at the base of each sludge blanket of the sludge blanket compartment B. The distribution channel D consists of three section: the desludging section D1, distributing section D2 and dissipating section D3. The distributing section D2 narrows in the direction of flow, proportionally to the water distributed through orifices 10 into the dissipating section D3. The dissipating section D3 communicates with the sludge blanket compartment B by two longitudinal slots 11. The distributing section D2 communicates with the desludging section D1 by orifices 12.

At the top of the sludge blanket compartment B collectors 13 of clarified water are located, which are by means of a connecting pipe 14 connected with the upper part of the filter F, where a through 15 for rinsing water is located. The filter F is a horizontal vessel, located eccentrically on the bottom of the sludge concentrator C. The sludge concentrator C is in the upper part provided with a collector 16 of settled water, which is by means of the connecting pipe 14 connected also with the filter F, by apertures 18 provided behind baffle plates 17, the sludge concentrator C communicates with the sludge blanket compartment B. The sludge concentrator C is provided at the bottom with sludge collector 19.

The described structure operates as follows: Raw water with added inorganic agglomeration agents enters the section H1 of the homogenizer H through the supply tube 8. In the section H1 a high intensity homogenization of the floc-suspension takes place. The turbulence in the first section H1 is produced by the rotor 2 and stator 3 provided with homogenizing blades of the shape of profiled paddles. At the end of the section H1 but still in the zone of vigorous homogenization the polycoagulants are added by means of dosing tube 7. Homogenization in the second section H2 of the homogenizer H is performed under reduced intensity of turbulence compared with the first section H1. High uniformity of homogenizing in the section H2 is reached by the rotor 5 and stator 6 provided with perforated blades. The longitudinal shape of the homogenizer proves advantageous conditions for homogenizing. The dimensions of the homogenizer H and the power supply for optimum homogenizing are determined by the experimentally found value of the Camp number, which for effective homogenizing amounts up to 150.000. The camp number is the result of the product $G \cdot t$, where $G = \frac{\sqrt{W}}{u}$ is the mean velocity gradient and $t$ is the time of homogenizing $W$ is the power loss per unit of volume and $u$ is the absolute viscosity of the liquid. The value of $W$ depends upon the dimensions and shape of the rotor, stator and homogenizer H as well as on the rotation speed of the rotor. The value of W can be determined by measurement of the input torque of the homogenizer rotor by means of the expression $W=(2\pi sT)/V$, where $s$ is the rotor speed in r.p.s., $T =$ the input torque, $V =$ the liquid volume.

The detention time in the first section H1 of the homogenizer H can be within the range of 1—3 minutes and in the second section H2 within the range of 6—12 minutes with suitably designed rotors and stators and with a rotation speed of the rotors, to obtain the required Camp number.

High floc volume concentration and high uniformity of floc-size distribution increases considerably the filterability of the homogenized floc-suspension. The high filterability of the suspension allows high filtration velocities in separation processes of water treatment and thus an increase of the output of the reactors up to 50 percent.

The treated water with the homogenized floc-suspension is supplied from the homogenizer H by means of the tube 9 into the distribution section D2 of the distribution channel D. By means or orifices 10 the water is distributed uniformly into the dissipating section D3 where the energy of water distributed by orifices 10 is dissipated. The dissipating section D3 communicates with the sludge blanket compartment B by means of two longitudinal slots 11. The dimensions of the slots are calculated to provide perfect fluidization of the sludge blanket eliminating any sedimentation in the sludge blanket compartment B. The desludging section D1 of the distributing channel D serves for draining the sludge blanket compartment B after the reactor is put out of operation. For this purpose the distributing section D2 is provided in its lowest part with orifices 12 communicating with the desludging section D1.

In the sludge blanket, the bulk of the floc-suspension is retained by filtration. The excess of suspension retained in the sludge blanket is continuously sucked off through apertures 18 into the sludge concentrator C. Baffle plates divert the incoming water in the sludge concentrator C towards its lower part, where the sedimentation and concentration of the floc-suspension takes place. The concentrated sludge is periodically drained by means of the sludge collector 19. The clarified water from the sludge blanket compartment B and the settled water from the sludge concentrator C are collected by the clarified water collectors 13 and the settled water collectors 16, which are connected to the connecting pipe 14 which supplies the cleared water to the filter F. The collectors are calculated so as to ensure 15—25 percent of water to flow through the sludge concentrator C. The filter F which is operating under a pressure produced by the raw water delivery pump, removes the rest of the floc-suspension and if the operating conditions are well chosen, a cleared water conforming to drinking water rules can be obtained without disinfection.

Figure 4:
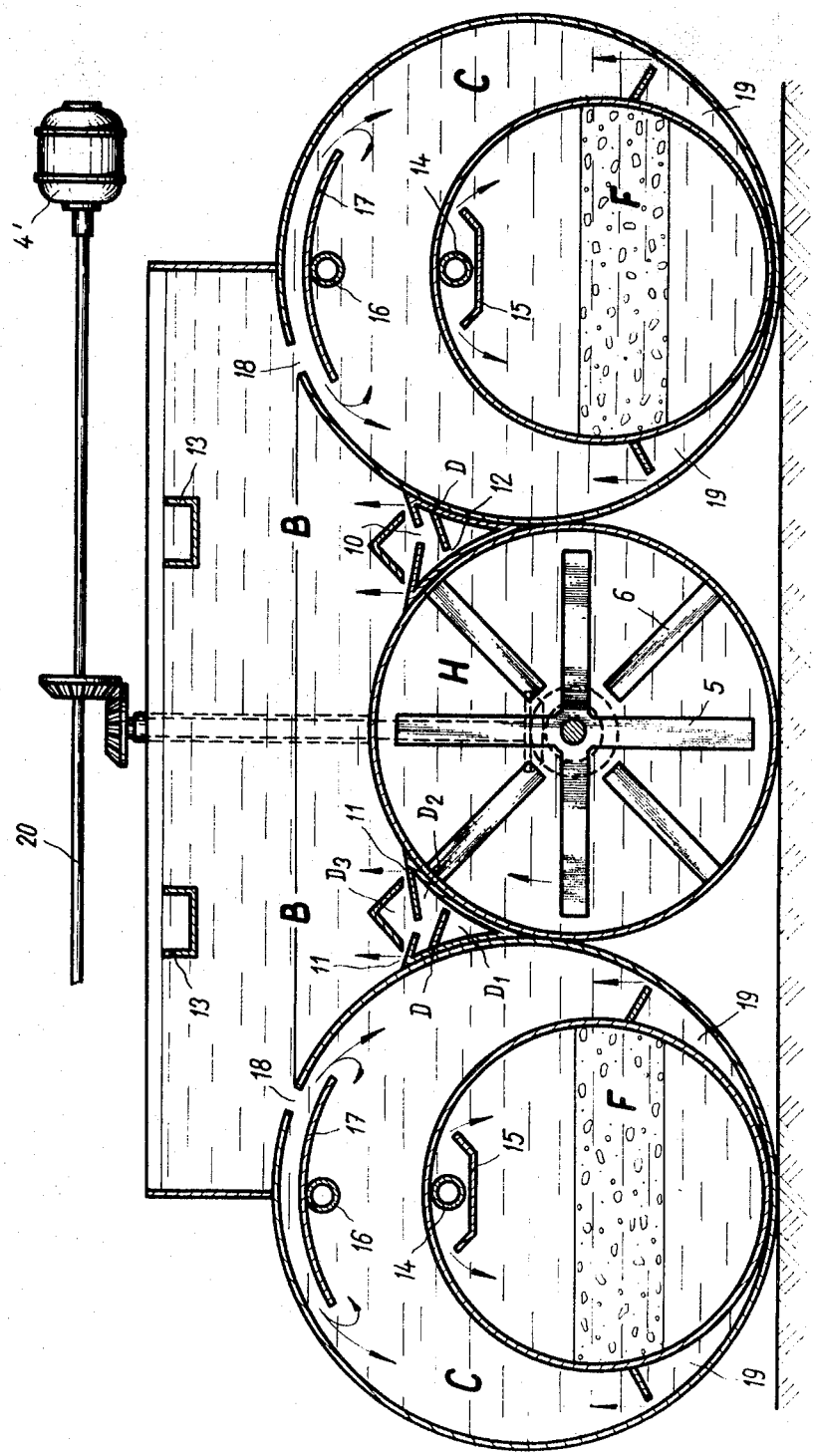
FIG. 4 is a schematic cross-sectional view of another embodiment of a water treatment arrangement according to this invention.
Figure 5:
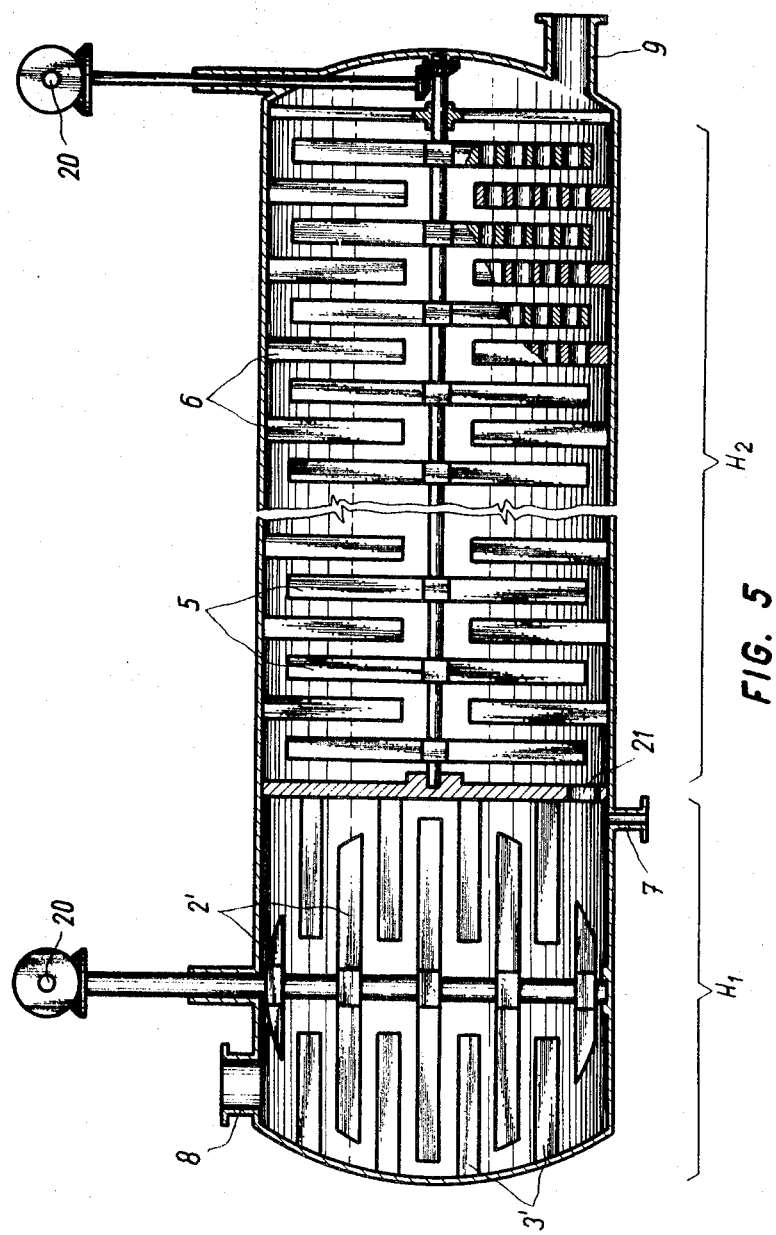
FIG. 5 is a longitudinal sectional view of another arrangement of the homogenizer.

The water treatment reactor schematically shown in FIG. 4 provided with a homogenizer schematically shown in FIG. 5 may be with advantage used as a technological unit, which when arranged in batteries side by side can form large water treatment installations in the range of hundreds and thousands of liters per second. The technological unit illustrated in FIG. 4 consists of five horizontal cylindrical vessels, the vessel used as homogenizer H being located between two sludge concentrators C, in which two horizontal filters F are eccentrically located. The open sludge blanket compartment B is substantially determined by external walls of the sludge concentrators C and of the homogenizer H. The homogenizer H is divided into two sections H1 and H2. The first section H1 is provided with a vertical rotor 2' and stator 3' with profiled solid blades. The propulsion of the rotor 2' is accomplished by a motor 4 and is transmitted by a horizontal shaft 20. The shaft 20 can serve for driving of a number of homogenizing sections H1, when more than one technological unit is installed. The homogenizing section H1 has at its upper part an input tube 8 and at its bottom an orifice 21 connecting both sections H1 and H2 of the homogenizer H. In homogenizing section H1 in front of the orifice 21 a dosing pipe 7 for dosage of polycoagulants is located. The second section H2 is similar with the section H2 shown on FIG. 2 and consists of a rotor 5 with a horizontal axis and a stator 6 with perforated homogenizing blades. The propulsion of the second section H2 is also effected by a horizontal shaft 20', so that the propulsion of a number of homogenizing sections H2 could be accomplished by a single motor 4'.

The homogenizer H is at the end of the section H2 connected by pipes 9 with the distribution channels D which are located at the base of the sludge blanket compartment B. The distribution channel D consists as in FIG. 3 of three sections: the desludging section D1, the distributing section D2 and the dissipating section D3. The arrangement of these three sections is the same, they are only adjusted to the different shape of the bottom part of the sludge blanket compartment B. The desludging section D1 communicates with the distributing section D2 by orifices 12 and the distributing section D2 communicates with the dissipating section D3 by orifices 10. The dissipating section D3 is also provided with two slots located above and symmetrically with respect to the orifices 10.

Collectors 13 of clarified water are provided at the water level in the open sludge blanket compartment B, which are by means of connecting pipes 14 connected with the horizontal cylindrical filters F. The connecting pipes 14 enter the filter F above the through 15 for rinsing water. The sludge concentrator C is in the upper part provided with a collector 16 of settled water located behind the baffle plate 17. The settled water collector 16 is also connected by means of connecting pipe 14 with the filter F. The sludge concentrator C communicates by means of apertures 18 with the sludge blanket compartment B. The sludge concentrator C has at the bottom sludge collectors 19.

The operation of the water treatment reactor according to FIG. 4 and FIG. 5 is similar to the operation of the arrangement described in the previous example. The only difference in performance is, that the pressure on the filter F is hydrostatic and is determined by the water level in the sludge blanket compartment B.

The arrangement of the water treatment reactor is advantageous for larger water treatment installations. The raw water with added inorganic agglomeration agents enters the first homogenizing section H1 of the homogenizer H by way of the supply tube 8. In the first section H1 a high intensity homogenizing takes place. The flow direction in this section is vertical, and the rotor 2' is also vertical. The stator 3' has homogenizing blades arranged horizontally in planes perpendicular to the flow direction. The propulsion of the rotor 2' by way of the motor 4 is accomplished by a horizontal shaft 20 so that a number of homogenizing sections H1 could be driven by one motor, if more than one technological unit is used. Before entering the second homogenizing H2 polycoagulants are dosed into the treated water by means of dosing pipe 7. By means of the orifice 21 located at the bottom of the homogenizing section H1 the treated water enters the second homogenizing section H2 which is provided with a rotor 5 and a stator 6 both having perforated homogenizing blades for obtaining high uniformity of turbulence and low turbulence vortex. The first homogenizing section H1 has a higher G and a shorter detention time $t$ than section H2. For effective homogenizing the value of the Camp number is in the range of 100.000—150.000. The treated water with the homogenized floc-suspension is distributed into the sludge blanket compartment B by means of the distributing channel D. The desludging section D1 of the distributing channel D is utilized for desludging of the sludge blanket compartment B after the operation of the reactor is stopped for a longer time. The distributing section D2 serves for distribution of the treated water into the dissipating section D3 of the channel D. The dimensions of shots 11 by means of which the distributing section D3 communicates with the sludge blanket compartment B are calculated to secure a perfect fluidization of the sludge blanket. By filtration in the fully fluidized sludge blanket the bulk of the floc-suspension is retained and the excess of the floc-suspension is continuously drained from the sludge blanket through the apertures 18 into the sludge concentrator C. In the sludge concentrator C the incoming flow is diverted to its bottom by the baffle plate 17 where the floc-suspension sedimentates and concentrates. The concentrated sludge is periodically drained by means of the sludge collector 16. The settled water is collected at the top of the sludge concentrator C by means of the settled water collector 16 located behind the baffle plate 17. The clarified water collected by the clarified water collectors 13 located at the top of the sludge blanket compartment B and settled water collected by the settled water collectors 16 are led by means of the connecting pipes 14 to the filters F. The collectors are designed so that a portion of 15—25 percent of treated water flows through the sludge concentrator C. The filter F is operating under the hydrostatic pressure determined by the water level in the sludge blanket compartment B.

The water treatment reactor according to the present invention has many advantages. The horizontal substantially cylindrical form of individual functional elements, which together constitute the water treatment reactor, enables a flexible incorporation of an optimum size homogenizer into the water treatment reactor of any desired capacity. The long cylindrical shape of the homogenizer provides optimum homogenizing conditions securing a high uniformity of homogenizing with minimum power consumption. The longitudinal flow through the whole homogenizer enables progressive homogenizing and application of more than one homogenizing stage with different homogenizing conditions, which provides favorable conditions for economical application of polycoagulants in combination with inorganic agglomeration agents.

High intensity homogenization and proper chemical treatment may increase the nominal capacity of water treatment reactors up to 50 percent and to reduce considerably the influence of seasonal changes of the raw water on the reactor capacity. In addition to these technological advantages the arrangement according to this invention brings advantages of a simple design. The advantageous longitudinal shape of the smaller capacity water treatment reactors, schematically shown in fig. 1, enables the design of complete compact reactors of small and medium capacity which are easily transportable. Cylindrical shapes of individual functional elements are easy to fabricate. The relatively limited size and low weight of the reactor enables transportation of the whole installation to the place of erection. Such installations do not require any housing.

The combination of large water treatment installation of individual, statically advantageous and transportable cylindrical vessels simplify considerably the construction of such installations. The dimensions of individual technological elements as the filter, homogenizer and sludge concentrator are such that they can be produced completely at the factory and transported to the site of erection. The simple cylindrical shape of individual constructional elements makes the production very easy. The described conception of water treatment installations entirely eliminates the necessity of construction of large concrete basins, which up to now were the basic constructional elements of large water treatment installations.

Another important advantage of the described reactors is their flexibility in operation. The capacity may be easily changed, by changing only the length of the installation, leaving all other principal dimensions of the reactor constant. This represent a very important advantage from the point of view of unification of constructional elements for various capacities of installations. Unification of constructional elements allows large series production of individual elements. According to this invention a limited number of standard constructional elements can cover all required capacities of water treatment installations in the range of 5 to $5.10^3$ liters per second.

All described advantages provide considerable savings of investment costs and of construction time. The high effectiveness of the water treatment processes, obtained by the described arrangement, reduces considerably the dependence of the reactor performance on raw water quality, simplifies the controls and provides favorable condition for complete automatization of similar installations.

The exemplary embodiments shown in the drawings are only some of a number of possible combinations. If no particular requirements are for the quality of the water the homogenizer and the filter can be eliminated. If biologically prepurified water has to be subsequently chemically treated the filter can be equally eliminated. The individual elements can be mutually joint according to requirements and their size or number adjusted to prevailing conditions.

We claim:

1. A water-treating apparatus comprising wall means defining a first substantially horizontally extending elongated compartment; an elongated substantially horizontally extending homogenizing compartment located at least in part in said first compartment; means for feeding water to be treated and a coagulation agent into one end of said homogenizing compartment; homogenizer means including mechanical agitator means in said homogenizing compartment to produce a homogenized floccular suspension from the material fed thereinto; means for discharging the water with the homogenized floccular suspension from the other end of said elongated homogenizer compartment; distributor means extending in the bottom region of said first compartment through the whole length of the latter connected to said discharge means, said distributor means comprising an elongated slot for discharging the water and the homogenized floccular suspension in upward direction into said first compartment so as to form in the latter a sludge blanket above said distributor means which is maintained in fluidized condition by the upward flow of materials through said slot, whereby the water passing through the sludge blanket is filtered; a substantially cylindrical vessel having a horizontal axis forming a sludge concentrating compartment located at least in part in said first compartment; overflow means providing communication between a portion of said first compartment located between the top and the bottom of the latter and an upper portion of said sludge-concentrating compartment for flow of sludge from said sludge blanket into said sludge concentrating compartment so that the sludge will settle in the bottom region of the latter; collecting means for collecting and discharging substantially clear water from the upper region of said first and said sludge concentrating compartment; and means discharging sludge from the bottom region of said sludge concentrating compartment.

2. An apparatus as defined in claim 1, and including a substantially cylindrical filter compartment arranged in the bottom region of said sludge concentrating compartment, said filter compartment having an axis substantially parallel to and downwardly spaced from that of said sludge concentrating compartment, said collecting means discharging said substantially clear water into said filter compartment so that the water is subjected to a second filtering operation.

3. An apparatus as defined in claim 1, wherein said homogenizer means comprise a plurality of stationary blades extending in radial direction inwardly into said homogenizing compartment, a rotary shaft having a substantially horizontal axis, a plurality of radially extending blades fixed to said shaft, and means for rotating said shaft and the blades fixed thereto about the shaft axis.

4. An apparatus as defined in claim 3, wherein said homogenizer compartment comprises two sections interconnected in series and wherein said homogenizer means are constructed to create a greater turbulence in said first section than in said section, said means for feeding water to be treated and a coagulation agent into said homogenizer compartment communicate with said first section.

5. An apparatus as defined in claim 4, wherein the blades fixed to said shaft in said second section are formed with openings extending transversely therethrough.

6. An apparatus as defined in claim 1, wherein said wall means forming said first compartment are substantially cylindrical, wherein said homogenizing compartment is likewise of cylindrical shape and located together with said sludge concentrating compartment entirely within said first compartment, the homogenizing and sludge concentrating compartments having cylindrical walls which engage each other and said wall means along lines located substantially in a vertical plane of symmetry.

7. An apparatus as defined in claim 1, wherein said homogenizing compartment is of cylindrical shape, and wherein two sludge concentrating compartments are provided located at opposite sides of said cylindrical homogenizing compartment, the aforementioned compartments having cylindrical walls engaging each other along lines located in a substantially horizontal plane and part of said walls above said plane forming part of said wall means defining said first compartment.

8. An apparatus as defined in claim 1, wherein said overflow means comprise an elongated substantially horizontally extending slot in the wall of said cylindrical vessel forming said sludge concentrating compartment and a curved baffle plate in said vessel beneath said slot.

9. An apparatus as defined in claim 8, wherein said curved baffle plate has a convex side facing said slot and a concave side, said collecting means in said sludge concentrating compartment being located at said concave side of said baffle plate.